US011644591B1

(12) United States Patent
Wang

(10) Patent No.: US 11,644,591 B1
(45) Date of Patent: May 9, 2023

(54) COMPUTER-IMPLEMENTED METHOD AND SYSTEM FOR OBTAINING A SUBSURFACE STACK IMAGE, SUBSURFACE ANGLE GATHERS, AND A SUBSURFACE VELOCITY MODEL, OVER AN ENTIRE SURVEY REGION HAVING HIGH VELOCITY CONTRAST GEO-BODIES

(71) Applicant: China Petroleum & Chemical Corporation, Beijing (CN)

(72) Inventor: Yongzhong Wang, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 25 days.

(21) Appl. No.: 17/487,182

(22) Filed: Sep. 28, 2021

(51) Int. Cl.
*G01V 1/30* (2006.01)
*G01V 1/28* (2006.01)

(52) U.S. Cl.
CPC ............. *G01V 1/303* (2013.01); *G01V 1/282* (2013.01); *G01V 1/306* (2013.01); *G01V 2210/6222* (2013.01)

(58) Field of Classification Search
CPC ........ G01V 1/303; G01V 1/282; G01V 1/306; G01V 2210/6222
See application file for complete search history.

(56) References Cited

U.S. PATENT DOCUMENTS

| 9,268,777 | B2 | 2/2016 | Lu et al. | |
| 10,739,478 | B2 | 8/2020 | Coates | |
| 2011/0075516 | A1* | 3/2011 | Xia | G01V 1/303 |
| | | | | 367/53 |
| 2013/0238249 | A1 | 9/2013 | Xu et al. | |

(Continued)

FOREIGN PATENT DOCUMENTS

WO    WO-2013152062 A2 * 10/2013 ............. G01V 1/282

OTHER PUBLICATIONS

Cong Luo, Xiangyang, Li, Guangtan, Huang; Pre-stack AVA Inversion by Using Propagator Matrix Forward Modeling; Pure and Applied Geophysics, 2019, Springer Nature Switzerland AG.

(Continued)

*Primary Examiner* — Catherine T. Rastovski
(74) *Attorney, Agent, or Firm* — Novick, Kim & Lee, PLLC; Allen Xue

(57) ABSTRACT

A computer-implemented method and computing system apparatus programmed to perform operations of the computer-implemented method for obtaining a subsurface stack image, subsurface angle gathers, and a subsurface velocity model over an entire survey region having high velocity contrast geo-bodies. Particularly, user inputs, input velocity models, and surface-seismic data are obtained by fixed source and receiver pairs and then used by the computer program product embedded within the computing system apparatus to minimize the number of iterations, required to obtain a final velocity model, a final stack image, and final (Continued)

angle gathers wherein their flatness deviation is equal to, or less than, a user-defined flatness value. Therefore, the attributes developed by said computer-implemented method and system can help solve the imaging problem of sub high velocity contrast geo-bodies like subsalt, or salt overhung deep mini basins.

3 Claims, 7 Drawing Sheets

(56) References Cited

U.S. PATENT DOCUMENTS

| | | | | |
|---|---|---|---|---|
| 2014/0233352 | A1* | 8/2014 | Kacewicz | G01V 1/303 367/73 |
| 2015/0124559 | A1* | 5/2015 | Cha | G01V 1/362 367/7 |
| 2019/0154857 | A1 | 5/2019 | Wang et al. | |
| 2019/0302293 | A1* | 10/2019 | Zhang | G01V 1/303 |

OTHER PUBLICATIONS

Paul C. Sava, Segey, Fomel; Angle-domain common-image gathers by wavefield continuation methods; Geophysics, vol. 68, No. 3 (May-Jun. 2003); pp. 1065-1074.

Biondo, Biondi, William, Symes; Angle-domain common-image gathers for migration velocity analysis by wavefield-continuation imaging; Geophysics Online, S, vol. 68, No. 3 (May-Jun. 2003); pp. 1065-1074.

Biondo, Biondi, William, Symes; Angle-domain common-image gathers for migration velocity analysis by wavefield-continuation imaging; Stanford Exploration Project, Mitchell Bldg., Department of Geophysics, Stanford University, Stanford, CA 94305-2215 (May 26, 2004).

Yuting Duan; Elastic Wavefield Migration and Tomography; Thesis Submitted to the Faculty and Board of Trustees of the Colorado School of Mines; 2006; pp. 1-174.

Vincent Prieux, Romain Brossier, Stephane, Operto, Jean Virieux; Multiparameter full waveform inversion of multicomponent ocean-bottom-cable data from the Valhall field. Part 2: imaging compressive-wave and shear-wave velocities; Geophysical Journal International, vol. 194, 2013, pp. 1665-1681.

Guy Hilburn, Yang He, Zengjia Yan, Francis Sherrill, High-resolution tomographic inversion with image-guided preconditioning and offset dependent picking; SEG Denver Annual Meeting, 204; pp. 4768-4772.

Fang Yuan; Multi-scale deformable layer reflection tomography and application to estimate base-salt geometry; Dissertation presented to the Faculty of the Department of Geosciences at the University of Houston; May 2015; pp. 1-110.

* cited by examiner

COMPUTER-IMPLEMENTED METHOD AND SYSTEM FOR OBTAINING A SUBSURFACE STACK IMAGE, SUBSURFACE ANGLE GATHERS, AND A SUBSURFACE VELOCITY MODEL, OVER AN ENTIRE SURVEY REGION HAVING HIGH VELOCITY CONTRAST GEO-BODIES

TECHNICAL FIELD

The present disclosure relates generally to computer-implemented methods and systems for seismic exploration of subsurface formations wherein ray-based methods and systems are used to obtain Common Image Gathers for sub high velocity contrast geo-bodies, e.g., subsalt, or salt overhung deep mini basins, but said methods and systems cannot provide reliable Common Image Gathers for those difficult areas, because the residual moveout curvatures of the reverse time migration angle gathers behave differently from those of ray-based methods, particularly for large angles. Therefore, convergence of reverse time migration angle gathers with those of the ray-based residual moveout curvatures cannot be achieved.

BACKGROUND OF INVENTION

1. Overview

Seismic exploration, also called seismic survey, involves the study of said subsurface formations of interest and geological structures. In general, the purpose of seismic exploration is to image the subsurface of a survey region to identify potential locations of hydrocarbon underneath the surface. Typically, seismic exploration and reservoir characterizations are performed over a region that is surveyed for its soil, and fluid potential properties. Depending upon the properties found in the survey region, one or various hydrocarbon reservoirs (i.e., oil and gas) may be established. Sometimes, these reservoirs may be found underneath subsurface high velocity contrast geo-bodies, like subsalt, or in salt overhung deep mini basin areas.

In seismic exploration, one or more sources of seismic energies (i.e., points of incidence or shots) are placed at various locations near the surface of the earth to generate a signal in the form of waves, which travel downward through the earth while entering subsurface high velocity contrast geo-bodies. Once the waves, generated by the emitted seismic energy, enter the subsurface formation, they get reflected, refracted, or scattered throughout the subsurface, which are then captured by receiving sensors that record, sample or measure said waves. The recorded waves are commonly referred to in the art, as surface reflection seismic data, or seismic traces. These data, or traces may contain information regarding the geological structure and properties of the survey region being explored. They are then analyzed using computer-implemented methods to extract details of the structure and properties of the survey region of the earth being explored. Many of these computer-implemented methods use an inversion model which comprise of an analytical approach in which depth-domain signals corresponding to the reflection of acoustic energy from reflective interfaces between subsurface strata in the earth are converted into one or more traces representative of physical attributes of the strata.

Nevertheless, most subsurface formations of interest (or geological structures) have developed fractures which were originated during karstification, and these karst systems were then buried underground. As such, the main storage space for hydrocarbon may have been in caves containing fractured zones which, in a sense made the key content of karst characterization, to become cave identification instead (Tian F, X. B Lu, S. Q Zheng, H. F Zhang, Y. S Rong, D. B Yang, and N. G Liu. 2017, *Structure and filling characteristics of paleokarst reservoirs in the northern Tarim basin, revealed by outcrop, core and borehole images*; Open Geoscience vol. 9 pp. 266-280; and Tian F, Z. X Wang, F. Q Cheng, W Xin, O Fayemi, W Zhang, and X. C Shan. 2019, *Three-dimensional geophysical characterization of deeply buried paleokarst system in the Tahe oilfield, Tarim basin, China*; Water vol. 11(5), p. 1045.). As this is not an easy task, a multi-prong approach of core sample description, well logging interpretation, 3D seismic modeling, and high-resolution impedance dataset was originally proposed by Fei Tian, et al., supra, (2019) to delineate the 3D geometry of the paleo-caves and other paleo-karst oil fields. Yet, this has still to assist those skilled in the art with high velocity contrast geo-bodies identification, as it further requires using innovative computer-implemented methods like the present invention, to solve the problem of high velocity contrast geo-bodies identification.

2. Fundamental Basis of Prestack Migration

Migration is a seismic data processing technique to map seismic events onto their appropriate positions (Sheriff, R. E., & Gerdart, L. P., 1995, *Exploration Seismology*, Cambridge University Press.). Migration is done either in time domain or depth domain, depending on the complexity of lithology. Time migration yields an inaccurate image in the presence of strong lateral velocity variation associated with complex overburden structure. In such cases, earth imaging is done by depth migration instead. Strong lateral velocity variation causes significant ray bending at layer boundaries, it gives rise to non-hyperbolic behavior of reflection times on common midpoint (CMP) gathers. As a result, amplitudes and travel times associated with the reflection events with non-hyperbolic moveout are distorted during conventional CMP stacking which is based on the hyperbolic moveout assumption. This causes CMP stack to depart from an ideal zero offset wave field. Therefore, when depth migration is needed, in principle, it is done before stack and not after stack (Yilmaz, Oz, 2001, *Seismic Data Analysis*, Society of Exploration Geophysicists). In most of these cases, Reverse Time Migration (RTM) is performed, as it is a pre-stack two-way wave-equation migration algorithm-solution suited for imaging in areas of complex structure, being able to handle steep structural dips and high velocity contrasts.

The first step in depth migration is to choose an interval velocity depth model. The quality of the depth image depends heavily on the input data, the inversion algorithm, and a chosen class of models (number of reflection interfaces, parameterization for interfaces, geometry, and velocities within the layers, etc.). Both time and depth migration use a diffraction term for collapsing energy along a diffraction hyperbola to its apex, only the depth migration algorithms implement the additional thin-lens term that explicitly accounts for lateral velocity variations. The general workflow used by one of ordinary skills in the art, for pre stack depth migration is as given below:

1) Stacking velocity analysis along time horizons;
2) Root-mean-square (RMS) velocity analysis along time migrated horizons;
3) Stacking velocity refinement along time horizons;

4) RMS velocity refinement along time migrated horizons;
5) Interval velocity and depth model creation (coherency inversion); and
6) Interval velocity and depth model refinement and modelling (tomography).

Nevertheless, because the geometry of acquisition in complex geological situations with rough topography is seldom regular, a Kirchhoff prestack depth migration seems to be the method of choice. The particular Kirchhoff integral that is used for data extrapolation and migration (See for instance, Schneider, William A., 1978, *Integral Formulation for Migration in two and three dimensions*, Geophysics vol. 43 pp. 49-76; and Bleistein, N. and S. H. Gray, 2001, *From the Hagedoorn imaging technique to Kirchhoff migration and inversion*, Geophysical Prospecting, vol. 49, pp. 629-645) is based on Green's theorem (Morese, Philip M. and Feshbach, Herman, 1953, *Methods of theoretical physics*, International Series in Puer and Applied Physics, pp. 791-869) and an integral solution of the wave equation, with 3D prestack seismic data recorded on separate sets of surface points. In practice the approximate Kirchhoff integral is (Sava, Paul, and Biondi, Biondo, 2004, *Wave-equation migration velocity analysis— I: Theory*, Geophysical Prospecting, Stanford Exploration Project, Stanford University), given by:

$$I(r) \approx \Sigma_{i \in A_r} W_i(r,m,h) D[t_D(r,m,h),m_i,h_i] \quad (1)$$

where the image I(r), is defined in a three-dimensional space r=(x,y,z), and is equal to the summation of data values D(t,m,h) evaluated at the time $t_D$(r,m,h) and weighted by an appropriate factor W(r,m,h) for amplitude. $m_i$ and $h_i$ are midpoint and offset positions.

Equation (1) is numerically computed as a loop over each image point I(r) and sums the contributions of all input traces that are within the migration aperture. Kirchhoff prestack depth migration uses the actual ray-path from every point-source to every receiving-sensor. This ray-path is used to construct the diffraction surface. The migration of a seismic section is achieved by collapsing each diffraction hyperbola to its origin (apex). In practice, each offset plane is first migrated separately and then, all offsets are summed together to generate the stacked migrated image. Therefore, the Kirchhoff prestack depth migration is performed in two steps. First summing data points with equal offsets, and then summing along offsets.

Because of its flexibility, the Kirchhoff prestack depth migration (PSDM) is one of the most used tools for processing seismic data. CPU-based PSDM has been used in the art, especially on CPU-clusters. Some algorithms, like Reverse Time Migration (RTM), run preferentially on Graphics Processing Units (GPU) based clusters (Xinyi Sun and Sang Suh, 2011, *Maximizing throughput for high performance TTI-RTM: From CPU-RTM to GPU-RTM*, SEG Technical Program Expanded Abstracts, pp. 3179-3183), and as such require a complex structure of computer systems typically comprising of input devices, memory resources, non-transitory program storage computer-readable memory encoded for computing an array of sub-process or sub-routines, a system computer, a computer system, and output devices. Investing in GPU-based clusters, means more software needs to be efficiently converted to maximize hardware utilization and decrease seismic processing costs. Kirchhoff PSDM seems to be a prime candidate for such a conversion.

Compared to current CPU, GPU have a lot more cores. Unfortunately, to leverage this parallelism, an existing CPU-only-code needs to be modified. These changes are not straightforward, and they require more knowledge about the architecture of GPU hardware than when implementing a CPU-only software. Some of the main requirements for good performance are memory alignment and access patterns like Compute Unified Device Architecture (CUDA) programming. Nonetheless, to date, most of the articles about porting Kirchhoff migration algorithms, Reverse Time Migration, or derivations thereof like Al-Yahya (1989) or Biondi and Symes (2004) to CPUs/GPUs tend to exercise most of the computational power available within a CPU or GPU solely to process the multiple iterations required to achieve a "close-enough" flatness value (See Panetta, Jairo & Teixeira, Thiago & Filho, P. R. P. & Finho, C. A. & Sotelo, David & Roxo, Fernando & Pinheiro, S. S. & Pedrosa, I. & Rosa, A. L. R. & Monnerat, Luiz & Carneiro, L. T. & Albrecht, C. H. B., 2009, *Accelerating Kirchhoff Migration by CPU and GPU Cooperation*, pp. 26-32, 10.1109/SBAC-PAD.2009.29.; and Brouwer W., Natoli, V., and Lamont, M., 2011, *A novel GPGPU approach to Kirchhoff Time Migration*, SEG Technical Program Expanded Abstracts, pp. 3465-3469), which embodiments of the present invention solve.

3. Tomography Inversion

As for tomography of depth migrated gathers, this tends to be a subroutine embedded within residual moveout methods, to refine a velocity-depth model. Tomography is based on the principle that if migration is carried out, with a correct velocity depth model, the image gathers should have an event depth equal at all receiving sensors (Tian-wen Lo and Philip Inder Weisen, 1994, *Fundamentals of seismic Tomography*, SEG monograph series). Therefore, tomography attempts to correct errors in the velocity depth model by analyzing the residual delays after PSDM. When prestack depth migration is performed with an initial incorrect velocity model derived from inversion methods based on non-global approaches, the depth gathers will exhibit non-flatness. The degree of non-flatness is a measurement of the error in the model. Tomography uses this measurement of non-flatness (residual moveout analysis) as input and attempts to find an alternative model, which will minimize the errors. The tomographic principle attributes an error in time to an error in both, velocity, and depth.

Yet, in the field of inverse theory, an object is described based on measurements or observations that are associated with that object. For industrial-scale applications, there is insufficient data to determine a unique solution and the data obtained may be noisy and/or unreliable. Consequently, an entire branch of mathematics has evolved with attempts to estimate a solution based on the interpretation of inaccurate, insufficient, and inconsistent data. In the case of travel time measurements made in seismic experiment, the inverse problem that is trying to get solved, is the velocity structure of the earth.

When merging the concept of tomography to inversion for multi-dimensional structures, one can observe that it has been utilized in oil field explorations since the late 1970's. However, the resolution for such inversions is typically in kilometers or even tens of kilometers. Details pertaining to the complex systems of oil field explorations cannot be resolved due to thousands of nodes incorporated into the models, so a 3D imaging that is still based on centralized off-line processing and is typically accomplished by multiple active-source recordings where variations over multiple year spans are the main goal. To achieve this, new schemes and methodologies are required to solve the real-time seismic tomography inversion problems, that cannot be achieved using single computational algorithms. This is one motivation for developing computer-implemented method that can relay an accurate imaging systems and models for high-velocity-contrast geo-bodies.

Because tomography is based on ray tracing, it can be formulated for reflection, transmission, and refraction. Several techniques for computing statics corrections in seismic reflection surveys make use of refraction tomography, whilst transmission tomography is used for cross-well applications where both the source and the receiver are inside the medium (within the boreholes); hence there is access to any transmitted arrival information. Exploiting amplitude information in addition to arrival times can further assist ray-based tomography in estimating a reliable velocity model (See for instance, Semtchenok N M, Popov M M, Verdel A R, 2009, *Gaussian beam tomography*, Extended Abstracts, 71st EAGE Conference & Exhibition, Amsterdam, U032). In addition to velocity estimation, tomography can be used to estimate other earth parameters, such as absorption. Further, tomography tries to solve a set of simultaneous equations using many ray-paths traversing the cells in the model. For a common-midpoint (CMP) gather, there are many travel time measurements for a given subsurface reflector element so the travel time expression for these ray-paths can be written as:

$$T = D*S \quad (2)$$

where T is the total travel time along the ray-path, D is the length of the ray-path in the cell of the velocity, and S is the slowness (i.e., the reciprocal of velocity) also in the cell of the velocity.

Unfortunately, in most cases, the matrix D is not invertible. To be invertible, it needs to be squared (i.e., the number of travel time measurements must just happen to be the same as the number of velocity cells in the model) and to fulfil some other criteria. So, instead, the algorithm is then inverted into the time delay and the slowness update resulting in expression:

$$\Delta t = D*\Delta s \quad (3)$$

However, there is a bit of a circular argument in the above description of the method because to estimate the ray-path segment lengths in the cells by ray tracing, a slowness update, and the local dip estimates of the reflector segments in each cell are needed. Hence when a method is initiated with forward modelling, by ray tracing using an initial guess of the model, and the associated travel times computed, that the present invention provides the first-guess or estimate model. The tomography must then be iterated to converge on the best estimate of the true model, by minimizing the differences between the observed travel times and those computed by ray tracing for the current guess of the model. Having said that, one skilled in the art would realize that there are other ways of solving for algorithm (2), such as: a direct solver, which is a one-step solution but only suitable for smaller scale problems; or an iterative solver, such as the conjugate gradient method (Scales, J. A., 1987, *Tomographic inversion via the conjugate gradient method*, Geophysics, vol. 52, pp. 179-85), which works well on large-scale systems.

The procedures described so far for tomography inversion, were cast in terms of observed and ray-traced travel times from unmigrated data. Over the past decade however, one skilled in the art has dealt primarily with data and measurements in the depth migrated domain, so there had also been a need to modify the tomography algorithms to account for the change of measurement domain. As such, tomography inversion in the migrated domain can be performed after either prestack time migration (See as an example Pierre Hardy and Jean-Paul Jeannot, 1999, 3-D reflection tomography in time-migrated space, SEG Technical Program Expanded Abstracts, pp. 1287-1290) or prestack depth migration (e.g., Christof Stork, 1992, *Reflection tomography in the post-migrated domain*, Geophysics vol. 57, pp. 680-692.), yielding a depth model in both cases, but the most widespread industrial practice is to invert using measurements from prestack depth migrated data. Which again, when either of these models are used independently, they account for less than useful lithology identification for one skilled in the art.

4. Velocity Analysis

Pre-stack migration methods are useful to reconstruct an image of the subsurface from seismic reflection data. In general, prestack migration is considered a robust method since it focuses energy that conventional data processing based on normal-moveout (NMO) correction and stacking of the common-midpoint (CMP) gathers cannot focus. In addition, the kinematics of prestack data considers the distance between the source and receiver, so that the source-receiver offset defines a prestack volume (See Bancroft, J. C., H. D. Geiger, and G. F. Margrave, 1998, *The equivalent offset method of prestack time migration: Geophysics*, 63, 2042-2053, doi: 10.1190/1.1444497).

Similarly, migration velocity analysis (MVA) is also an important seismic processing step in pre-stack time imaging. Basically, MVA exploits the redundancy of seismic data to improve an a priori (or input) velocity model. Seismic data from different offsets need to be migrated to the same positions when using the correct velocity model (See Sattlegger, J. W., 1975, *Migration velocity determination, Part I: Philosophy: Geophysics*, 40, 1-5, doi: 10.1190/1.1440512). Hence, these images must be horizontally aligned, regardless of structure. However, the use of too-low or too-high migration velocities leads to offset/angle dependent mispositioning (i.e., offset/angle gathers not flat), known as migration smiles or frowns (See for instance Al-Yahya, K., 1989, *Velocity analysis by iterative profile migration: Geophysics*, 54, 718-729, doi: 10.1190/1.1442699).

It is known by persons of ordinary skill in the art, that depth-domain seismic images from the reverse-time-migration (RTM), reveal the reflectivity from subsurface interfaces with impedance contrasts; while stack images and angle gathers contain information about the amplitude variation with angle (AVA). It is also known that high-velocity-contrast geo-bodies with different scales and sizes, are common features in carbonate fractured reservoirs. These systems contribute a lot to the production of oil and gas because they provide both storage spaces and migration pathways for hydrocarbons. Using seismic data, like pre-stack gathers and seismic attributes to identify the characteristics of the high-velocity-contrast geo-bodies, is a key approach to better understand the carbonate pathway of fractured reservoirs. As such, several methods have been proposed. In fact, over the years, substantial effort has been directed toward the development of new MVA methods, but none has reached an accurate solution. Nonetheless, most tend to be based on the use of residual-moveout (RMO) analysis because of its conceptual clarity and simplicity. Many of said RMO algorithms are based on the moveout formula for a horizontal reflector in offset domain, or migration angle domain seen in Al-Yahya, K., 1989, *Velocity* analysis by iterative profile migration: Geophysics, 54, 718-729, doi: 10.1190/1.1442699. Nonetheless, in the case of high-dipping reflectors, this correction does not take into account the lateral displacement of the reflector image that is caused by a change in migration velocity, thus requiring multiple iterative procedures in order to process and achieve higher accuracy in the updated velocity by inclusion of the reflector dip as an additional parameter (See Biondi, B., and W. W. Symes: *Angle-domain common-image gathers for migration velocity analysis by wavefield-continuation imaging: Geophysics*, v. 69, pp. 1283-1298.).

Thus, because of all these failed attempts to reduce the accumulative error, to provide accurate and reasonable results; direct and indirect extraction of stack images and angle gathers from seismic reflection data have gained much attention in recent years, especially given the wider availability and access to high performance computing systems, required to solve methods that require multiples iterations. Yet, none have proposed a method that requires the least number of iterations, therefore resulting in a consistent approach to solving these problems whilst minimizing the number of computational resources (CPU or GPU) required.

5. Semblance Analysis

As previously mentioned, building subsurface velocity model is one of the most important issue in exploration geophysics. There are generally four ways for building the velocity model. One of those four ways is by employing a normal-moveout (NMO) based velocity analysis, which requires selecting peaks in the velocity spectra (See Taner, M. T., and F. Koehler, 1969, *Velocity spectra—Digital computer derivation and applications of velocity functions*: Geophysics, 34, 859-881; Fomel, S., 2009, *Velocity analysis using AB semblance*: Geophysical Prospecting, 57, no. 3, 311-321; Luo, S., and D. Hale, 2012, *Velocity analysis using weighted semblance*: Geophysics, 77, no. 2, U15-U22), which in turn is obtained by applying several NMOs with different velocities and then calculating their corresponding semblances. As it can be observed, using semblance measures is an indispensable step for building an initial subsurface velocity model. Nevertheless, there exist several types of semblance methods, depending upon the specific datasets that is used. A person having ordinary skills in the art will recognize that the most used semblance method, uses a conventional approach.

The conventional semblance approach was originally defined by Neidell and Taner in 1971 (See Neidell, N. S., and M. T. Taner, 1971, *Semblance and other coherency measures for multichannel data*: Geophysics, vol. 36, pp. 482-497,) as:

$$s(i) = \frac{\sum_{j=i-M}^{i+M} \left( \sum_{k=0}^{N-1} a[j,k] \right)^2}{N \sum_{j=i-M}^{i+M} \sum_{k=0}^{N-1} a^2[j,k]} \quad (4)$$

where i and j are time sample indices, s(i) denotes the semblance for time index i, 2M+1 is the length of the smoothing window (in this formulation a boxcar filter is used), along time axis, and α(j,k) is the trace amplitude at time index j and trace number k of the NMO-corrected common midpoint (CMP) gather.

Others have developed variations off the conventional semblance approach, as observed in Sarkar, D., J. P. Castagna, and W. Lamb, 2001, *AVO and velocity analysis*: Geophysics, vol. 66, pp. 1284-1293; and Fomel, S.; and E. Landa, 2014, *Structural uncertainty of time-migrated seismic images*: Journal of Applied Geophysics, vol. 101, pp. 27-30), that modified the conventional semblance formulation and proposed amplitude-versus-offset (AVO) adaptive semblances. Similarly, Luo and Hale, supra, proposed increasing the resolution of the semblance map to distinguish the peaks between primary and multiple reflections. They did this, among other things to increase the resolution of the semblance spectra for picking the true NMO velocity, due to the existence of multiples common midpoint (CMP) gathers (Luo and Hale, supra).

6. Conclusion

Therefore, the combination of the methods as demonstrated, suffer from a wide array of limitations which make it difficult to conduct reliable and accurate readings, and thereby limiting a person skilled in the art to properly assess high-velocity-contrast geo-bodies. As such, in view of the known art, it is therefore seen as one object of the invention to improve and enhance known methods and systems for characterizing and recognizing high-velocity-contrast geo-bodies using an advanced computer-implemented system, that can quickly and accurately compute an array of functions, with the least amount of iterations, whilst providing the user of said computer-implemented systems, typically a person skilled in the art, with full control and understanding of the conditioning processes applied, thereby instilling greater confidence and less uncertainty in the results of the high-velocity-contrast geo-bodies, for a subsequent reservoir characterization over a survey region having at least one hydrocarbon well or reservoir location. In fact, the present disclosure solves the problem observed in algorithms like Al-Yahya (1989) and Biondi and Symes (2004) by matching the reverse time migration angle gather with the residual moveout curvature in large angles, without requiring any of the assumption used by either of the aforementioned. Particularly, Al Yahya (1989) requiring the use of Kirchhoff surface offset converted angle gathers or Biondi and Symes (2004) requiring that their algorithm be applied in true angle domain only under the assumption of stationary ray-paths.

SUMMARY OF THE INVENTION

A computer-implemented method and system for creating velocity models, stack images, and angle gathers is disclosed wherein the angle gathers of the reverse time migration can perfectly converge with that of the residual moveout curvatures in full angle range including large angles in localized homogeneous media within a pre-determined survey region. Depending upon the properties found in the survey region, one or various hydrocarbon reservoirs (i.e., oil and gas) may be established. Once these reservoirs, or wells, are established within the survey region, computer-implemented methods are used for automating the interpretation of seismic results. Many of these computer-implemented methods are used independently by one skilled in the art because of their limitations to process a vast amount of data, perform distinct computational algorithms at the same time, or comprise of a single computer-implemented analytical approach in which depth-domain signals corresponding to the reflection of acoustic energy from reflective interfaces between subsurface strata in the earth are converted into one or more traces representative of physical attributes of the strata. Furthermore, these attributes are then analyzed offline by one skilled in the art, like geophysicists which in turn create a summary document in another existing computer-implemented program like word processors or spreadsheets.

In contrast, it is therefore an object of the embodiments of the present invention, to provide a single computer-implemented method and system, for the generation of velocity models, stack images, and angle gathers using an array of seismic reflection data, to successfully, efficiently, and accurately identify the diffractions associated with high-velocity-contrast geo-bodies from reflection events of overburden and carbonate background layers. The novel reverse time migration algorithm provides the necessary input for building a tomographic model in angle domain, which are decomposed into azimuthal sectors and opening angles. Thereafter, the information picked using curvature analysis (gamma scanning) and semblance picking, which are then combined into one picking algorithm. Based on in-network tomography inversion, embodiments of methods and systems improve the real-time performance of the distributed approach are described herein. The key challenge of real-time tomography inversion is to update the system model incrementally before all information of seismic events is available. In one aspect, distributed incremental least-squares algorithms can be used, in which history data are exponentially weighted according to oldness. In another aspect, use of a row action matrix method is proposed, which does not require the full design matrix to be in memory at one time. In fact, the approach of consecutive back projection can incorporate new information (ray-paths or rows), in real time. In this case, the model is constantly being updated by new information and are incorporated to the computer-implemented method via a high-performance computing system apparatus that minimizes computational costs, the subjectivity of a person skilled, and the need to further summarize any analysis.

Further objects of the present invention include the use of computing system apparatus having a computer program product, pre-programmed with the computer-implemented method for obtaining a subsurface stack image, subsurface angle gathers, and a subsurface velocity model, over an entire survey region having high velocity contrast geo-bodies. The computer program product pre-programmed with the computer-implemented method receives certain initial velocity models and seismic reflection data that is turned into an initial stack image and initial angle gathers. The initial stack image is then used to compute a dip field by analyzing shifts in correlation using moving-window technique, whilst the initial angle gathers are used to compute a residual moveout migration depth in true angle domain using a uniquely developed algorithm found to work best in the proposed computer-implemented method. Thereafter, the volumetric curvature analysis for the angle gathers essentially scans in the provided range and picks the curve with the maximal semblance to capture the depth and angle information that exists within the uniquely developed RTM algorithm, wherein such analysis can be performed volumetrically on each azimuthal sector individually. This picking scheme is complemented by a more general picking algorithm that measures the moveout shift by a cross-correlation technique. The computer-implemented method then applies tomography inversion to regularization using a Gaussian smoother that enables the computing system apparatus to build an updated velocity model progressively from low frequency to high frequency and gradually flatten angle gathers ending to within a pre-determined range, thereby outputting a final stack image, final gathers, and a final velocity model. Further details, examples and aspects of the invention will be described below referring to the drawings listed in the following.

BRIEF DESCRIPTION OF THE DRAWINGS

The teachings of the present invention can be readily understood by considering the following description in conjunction with the accompanying drawings.

DETAILED DESCRIPTION OF THE INVENTION

Reference will now be made in detail, to several embodiments of the present disclosures, examples of which, are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

Figure 1:
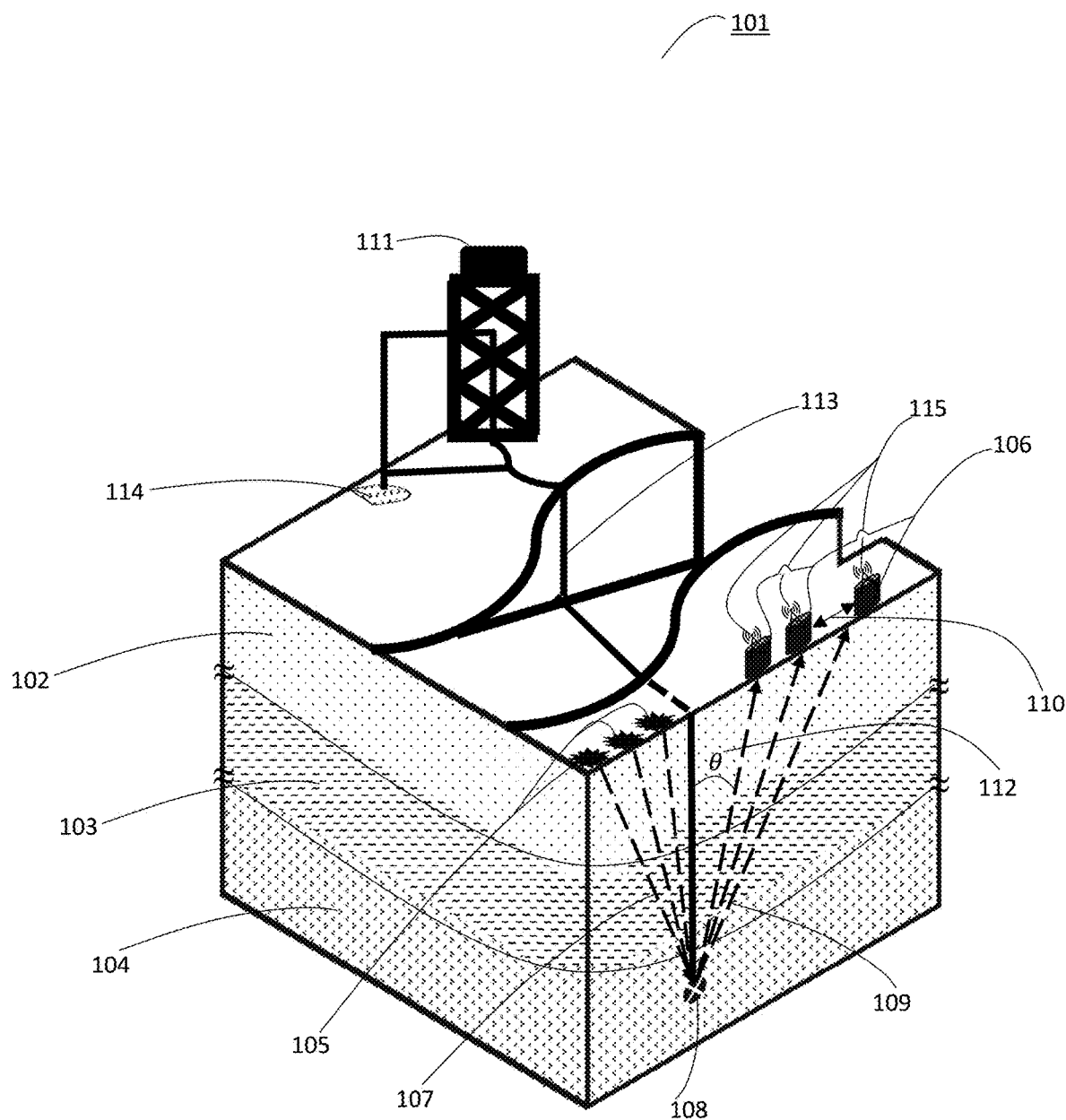
FIG. 1, is a schematic diagram showing a cross-sectional view of an illustrative survey region with points of incidence of seismic sources, seismic receivers, a well location, a wellbore, a geo-body, a reflector area (e.g., a horizon or other reflector area), the various transmission traces, the various depths, and the various angles of incidence, according to certain embodiments of the present disclosure.

In FIG. 1 a cross-sectional view of a portion of the earth over survey region 101, is illustrated showing different types of earth formation, 102, 103, and 104, which will contain part of the seismic survey data used in the present invention. Persons having ordinary skill in the art, will soon realize that the present example shows a common midpoint-style gather, where seismic data traces are sorted by surface geometry to approximate a single reflection point in the earth. In this example, data from several shots, 105, and receivers 106 may be combined into a single image gather, a common midpoint location, or used individually depending upon the type of analysis to be performed. The shots, 105, generate source-traces or source-wavefields, 107. Although the present example illustrates a geo-body, 108, a flat reflector (e.g., such as a horizon) and their respective image gather class, as well as other types or classes of image gathers known in the art maybe used, and its selection may depend upon the presence of various earth conditions or events.

As shown on FIG. 1, seismic energy from multiple points of incidence or shots 105, will be reflected from the interface between the different earth formations 102, 103, and 104 as well as from geo-body, 108. These reflections, 109, contain surface seismic data and energy that emanates from the points of incidence, 105, that will then be captured by multiple seismic data recording sensors 106, each of which may be placed at different location offsets 110 from each other, and the well 111. By contrast, a person having ordinary skills in the art will recognize that individual source traces can emanate as well, from source 105 that impinges on geo-body 108 which is then diffracted into a plurality of receiver traces 109 that travel to receiving or recording sensor 106.

Because all points of incidences 105, and all seismic data recording sensors 106 are placed at different offsets 110, the survey seismic data or traces (107 incidence trace, and 109 receiver trace), also known in the art as gathers, will be recorded at various angles of incidence represented by 112. The points of incidence 105 generate downward transmission rays 107, in the earth that are captured by their upward transmission reflection 109, through the recording sensors 106. Well location 111, in this example, is illustrated with an existing drilled well attached to a wellbore, 113, along which multiple measurements are obtained using techniques known in the art. This wellbore 113, is used to obtain well log data, that includes P-wave velocity, S-wave velocity, Density, among others. Other sensors, not depicted in FIG. 1, are placed within the survey region to also capture horizons data information required for interpreters and persons of ordinary skilled in the art to perform various geophysical analysis. Furthermore, drilling fluid or mud stored in pit 114 is formed at the well site in the survey region 101 and sent through the mud channel of the wellbore 113 to lubricate the wireline or logging-while-drilling (LWD) downhole system drill bit which thereafter is also used to carry formation cuttings up to the surface as it is returned to pit 114 for recirculation. Of further importance, the wireline or logging-while-drilling (LWD) downhole system includes a bottom hole assembly (BHA), generally disposed near the drill bit with capabilities for measuring, processing, computing, generating, and storing information, as well as wirelessly or wired communicating with an above-surface computing system apparatus 301 for further processing.

In the present example, the gathers will be sorted from field records to examine the dependence of amplitude, signal-to-noise, move-out, frequency content, phase, and other seismic attributes, on incidence angles 112, offset measurements 110, azimuth, and other geometric attributes that are important for data processing and imaging and known by persons having ordinary skills in the art. All the data collected by the receiving sensors, 106, will be stored temporarily at location, and then transmitted by data transmission systems, 115, wirelessly from said sensors, 106, to the computing system apparatus of FIG. 3, for retrieving, storing, processing, computing, and generating.

As previously mentioned, the present disclosure aims at solving one of the most fundamental issues observed while analyzing information from seismic exploration survey regions. Particularly the fact that reverse time migration angle gathers do not converge with the conventional residual moveout curves, thereby making it difficult (if not impossible) for persons having ordinary skills in the art, to directly apply the reverse time migration angle gathers to tomography inversion sub-processes or routines. Generally, for a fixed source (105) and receiver pair (106), since the travel time and offset always kept invariant, after some simple triangular function operations, for a constant velocity model and flat-reflector those skilled in the art would end up with the following algorithm, where $z_m$ is the migration depth, $z_t$ is the true depth, $$\gamma = \frac{v_m}{v_t},$$

$v_m$ is the migration velocity, $v_t$ is the true velocity, $\theta_m$ is the migration angle, and $\theta_t$ is the true angle:

$$z_m = z_t \gamma \frac{\cos\theta_m}{\cos\theta_t} \qquad (5)$$

Figure 4A:
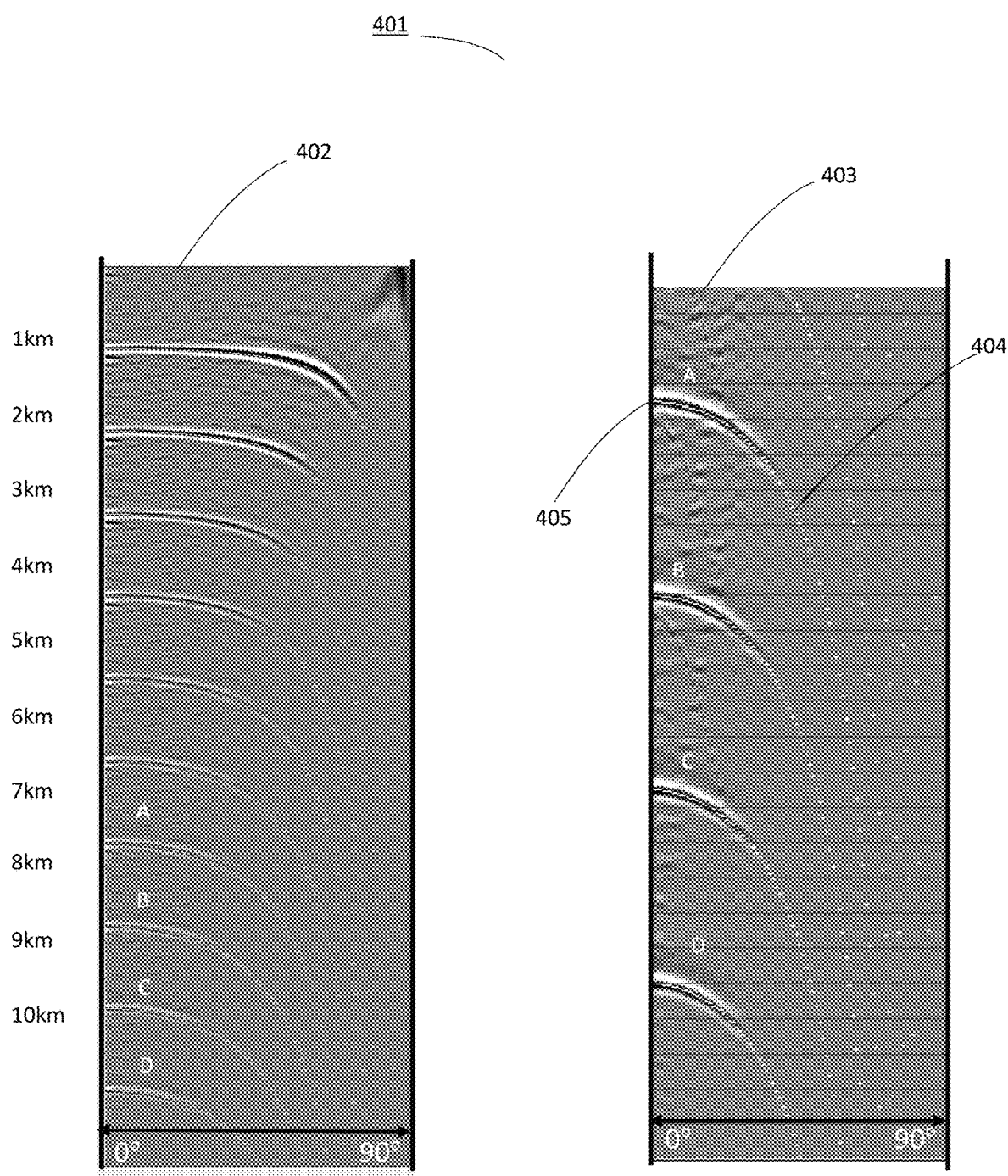
FIG. 4A, FIG. 4B and FIG. 4C, illustrate in graphic representation, a set (regular scale and zoomed-in) of angle gathers for a series high-velocity contrast geo-bodies a series of subsurface reflectors as generated by the computing system apparatus for obtaining a subsurface stack image, subsurface angle gathers, and a subsurface velocity model, over an entire survey region having high velocity contrast geo-bodies (FIG. 4A), as well as illustrations in graphic representation of existing methods (FIG. 4B and FIG. 4C) to illustrate how their outputs generate misalignments of the RMO curves in angle domain when compared as those generated by the present disclosure.
Figure 4B:
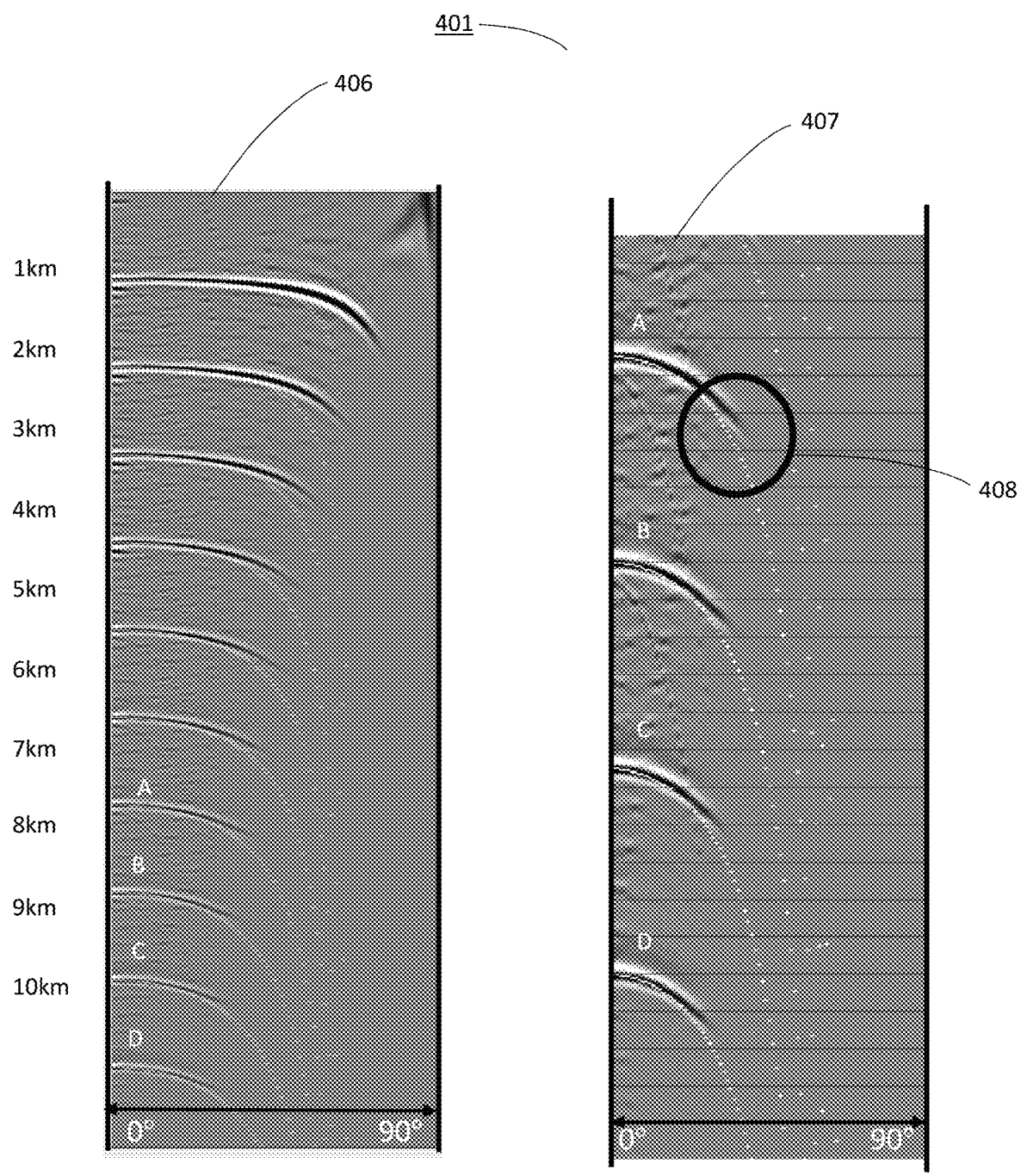

Nonetheless, since the following always holds true:

$$\cos\theta_m = \frac{z_m}{\sqrt{z_m^2 + h^2}} \qquad (6)$$

$$\cos\theta_t = \frac{z_t}{\sqrt{z_t^2 + h^2}} \qquad (7)$$

Where h is the half-offset 110 and substituting algorithm (6) and (7) into (5) persons with ordinary skill in the art have resulted to the Al-Yahya (1989) algorithm (8), that still does not provide a true alignment between reverse time migration angle gathers and residual moveout curvatures as observed by FIG. 4B:

$$z_m^2 = \frac{(z_t \gamma)^2}{1 - (\gamma^2 - 1)\tan^2\theta_m} \qquad (8)$$

Similarly, the other alternative left for persons having ordinary skills in the art in order to somewhat achieve convergence of reverse time migration angles with the residual moveout curvatures, is to pursue the option of using Biondi and Symes (2004) algorithm (9), which limits that potential uses as it intrinsically requires a stationary raypath, that the migration structural dip field be the same as the true structural dip filed, and that the migration open angle be the same as the true open angle:

$$z_m = z_t \gamma \left(1 + \left(1 - \frac{1}{\gamma}\right)\tan^2\theta_t\right) \qquad (9)$$

Figure 2A:
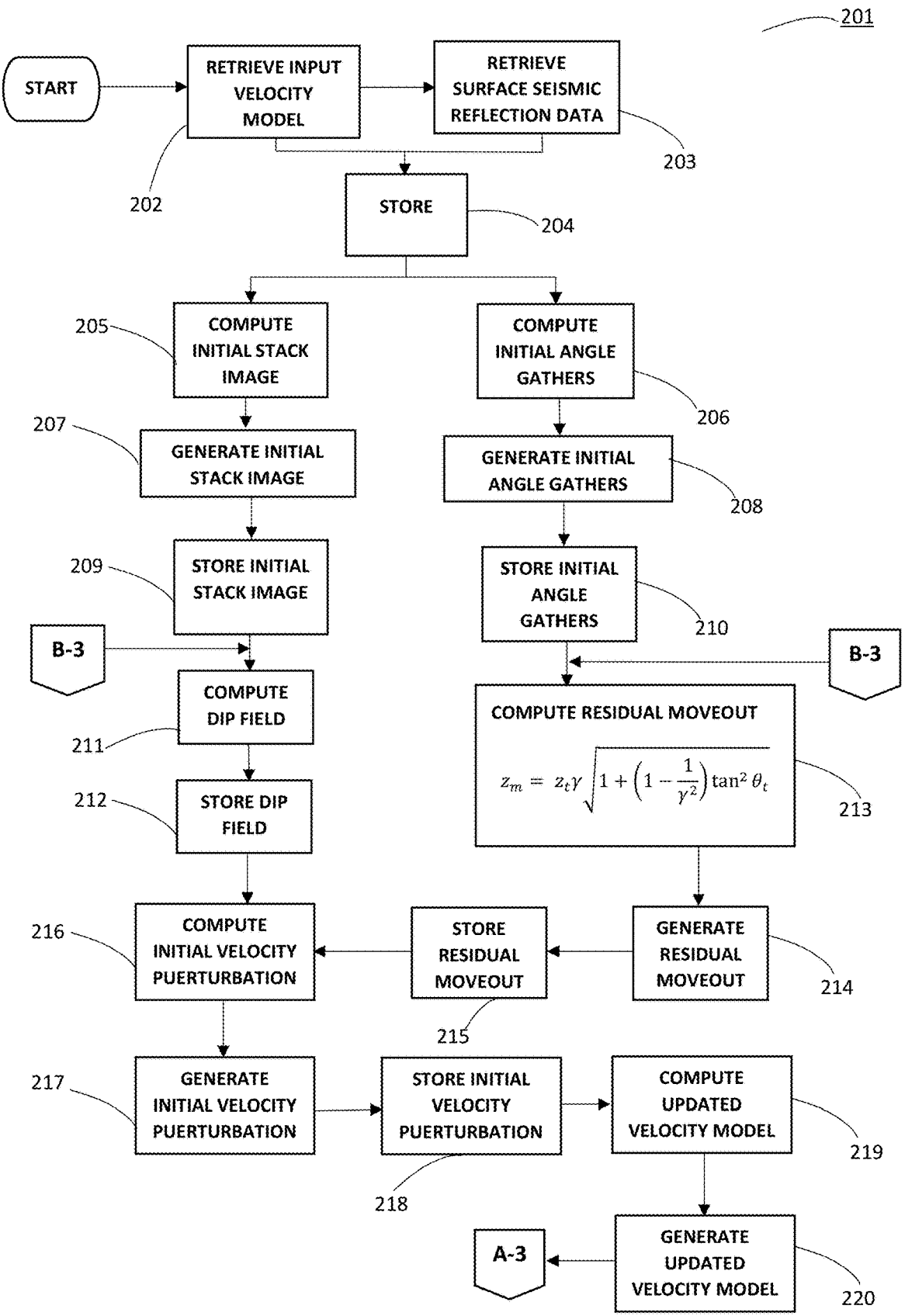
FIG. 2A, and FIG. 2B illustrate a flow chart showing the computer-implemented method performed by a computing system apparatus for obtaining a subsurface stack image, subsurface angle gathers, and a subsurface velocity model, over an entire survey region having high velocity contrast geo-bodies, according to an embodiment of the present disclosure.
Figure 2B:
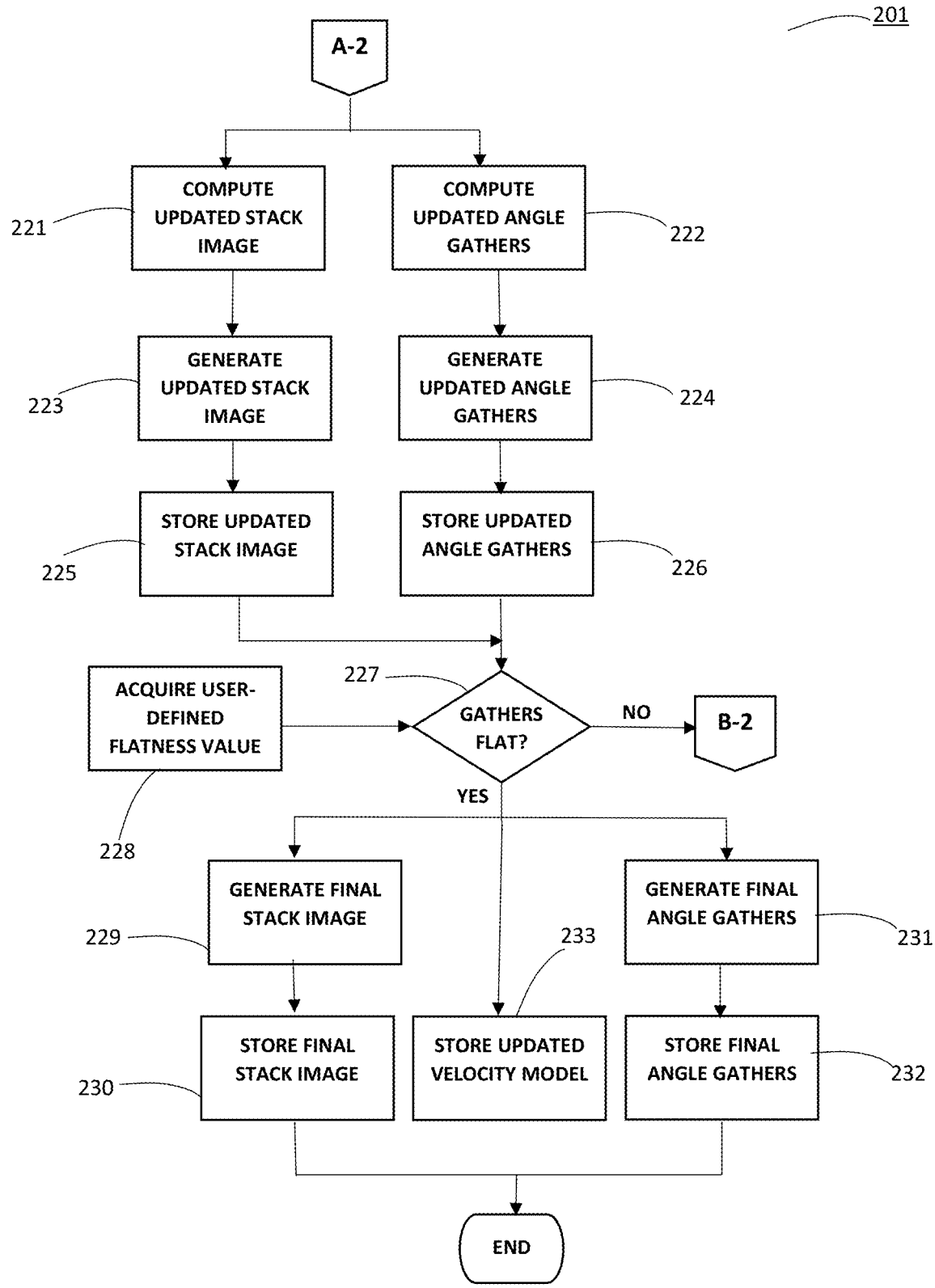

Therefore, an improved alternative is hereby proposed wherein the computer-implemented method of FIG. 2A and FIG. 2B produces a more accurate convergence, and thus provide better understanding of the sub-surfaces, including for example, whether high-velocity contrast geo-bodies can be used as a guide for drilling engineers to optimally place and locate their well trajectories to the prospective hydrocarbon reservoir.

As shown in FIG. 2A and FIG. 2B, the computer-implemented method, 201, is typically embedded within a computer program product within the memory device 307 of a non-transitory computer readable memory device 305. Said method 301 initiates by retrieving, 202 and 203, using the non-transitory computer readable memory device 305 from the memory resource, 303, data that was acquired by the plurality of field receiving sensors, 106, located within a survey region, 101. The data acquired generally comprises of different types of inputs like: well log data represented in time domain, an input velocity model wherein the input velocity model ($V_0$) is essentially derived from P-waves over the entire survey region, 202, surface seismic reflection data represented in time-domain essentially consisting of common shot P-waves, over the entire survey region, 203, which further comprises of data from seismic traces, 214, source and receiver-wavefield information. The surface seismic reflection data 203 may be obtained directly from the geo-body 108 and wirelessly transmitted by 115 which is instead received by 302 and transferred onto database 303 through network 304, for further compilation, such as that contemplated on FIG. 4A. It may also be retrieved from database 303, by the non-transitory computer readable memory device 405, and the computer system output device 308. For the present invention to properly function, the input velocity model is essentially derived from P-waves, and the surface seismic reflection data represented in time-domain data essentially consisting of common shot P-waves, but a person with ordinary skills in the art will realize that in the present embodiment other sets of data may also be collected and stored. Further, both set of data retrieved comprise of a plurality of data points, constant with the number of points of incidence 105 within a survey region 101 represented in the time domain at the various angles of incidence 112. Nonetheless, since this surface seismic reflection data 203 is too raw, noisy, or from various points of incidence 105, it needs to be further processed, hence the reason why it needs to be stored by the non-transitory computer readable memory device 305 to the memory resource 303. The further refinement occurs when the non-transitory computer readable memory device 305 message the memory resource 303, that it will begin computing an initial stack image and initial angle gathers, by performing initial reverse time migration at 205 and 206, from the stored input velocity model and the stored surface seismic reflection data. Further, imaging complex geo-bodies inside the earth requires reasonable velocities that are provided by the computed migration velocity model of 205 and 206, based on the principle that the images in the migrated data will be distorted when an erroneous velocity is used, and the difference of the imaged depths (residual moveout) at a common image gather is a measure of the error in the velocity. This step is crucial for the computer-implemented method 201, as it requires that correct input velocities accurately explain the relative time delays between reflection traces 109 that are originated from the same interface in the subsurface, but were reflected with different aperture angles, 112, at reflection points. Once sub-routine or independent processes 205 and 206 are completed, an initial stack image and initial angle gathers are generated by the non-transitory computer readable memory device at 207 and 208 and stored to memory resource, 209 and 210.

Non-transitory computer readable memory device 305, then acquires from the memory resource 303, in a parallel operation (represent by 228 on FIG. 2B) a user-defined flatness value for the stored initial angle gathers. This user-defined flatness value is of utmost importance for the present disclosure, as it will prevent the computer-implemented method 301, from going into an infinite loop. Said user-defined flatness value means for the computer-implemented method of the present invention, that the stacked image is focused well, and contained no swing noises. Furthermore, it means that for the same seismic event, the angle gathers are lined up with angle ranges, e.g., from zero degree to 90 degrees, to see whether the gathers look like a horizontal flat line.

A dip field is then computed by the non-transitory computer readable memory device at 211, by analyzing using the non-transitory computer readable memory device the shifts in correlation according to the moving-window technique. This is pre-programmed onto the memory resource, 307, of non-transitory computer readable memory device, 305, in accordance to said moving-window technique as available in the existing art. However, to properly performed step 211, the corresponding trace in the initial image gathers is used and an analysis window is extracted, wherein the start and end of the extracted analysis window are tapered in lengths equal to the lesser of 10 samples, or ¼ of the analysis window. An autocorrelation process is then computed by the non-transitory computer readable memory device 305 in a data window of the display 310 of the computer system output 308, wherein the length of the autocorrelation is equal to ½ of the desire wavelength. The amplitude spectrum of the autocorrelation is computed by the non-transitory computer readable memory device 305, and the square root of the autocorrelation is also computed, by the non-transitory computer readable memory device 305 to obtain the dip field 211. Once the computational step of the dip-field is performed, the non-transitory computer readable memory device will message the memory resource 303, to begin storing said computed dip field at 212.

The by memory resource 303, then sends a message hook to the by non-transitory computer readable memory device 305, to initiate the complex algorithmic sub-routine 213. Said sub-routine 213 is the critical path (step) within the computer-implemented method, as it is the one that provides the perfect convergence between reverse time migration angle gathers and the residual moveout curvatures, not otherwise achievable within the existing technology of the art. As such, sub-routine 213, is initiated by the non-transitory program computer readable memory device, 305 by retrieving from the memory resource 303, the initial angle gathers that were stored at 210. Once that is completed, the memory resource will again message the non-transitory computer readable memory device 305 to compute a residual moveout migration depth in true-angle domain using the by non-transitory computer readable memory device 305 hybrid GPU/CPU computer hardware, where both computational components are needed to take part in the computation of wave propagation and wave-field cross-correlation. This approach reduces the computational cost, in accordance with the following algorithm:

$$z_m = z_t \gamma \sqrt{\left(1 + \left(1 - \frac{1}{\gamma^2}\right) \tan^2 \theta_t \right)} \qquad (10)$$

Once the residual moveout migration depth in true angle domain has been computed at 213, the non-transitory computer readable memory device 305 will generate at 313 an output in graphical form as well as in numerical representation of the residual moveout value, which will then sent to the memory resource for storage at 215. Using the combination of the stored dip field (at 212) and that of the recently stored residual moveout (215), the non-transitory computer readable memory device 305 will begin computing at 216 an initial velocity perturbation ($d_v$) by performing tomography inversion which must be pre-programmed in the non-transitory computer readable memory device 305. The initial velocity perturbation is then generated at 217 by the non-transitory computer readable memory device 305, which then transfers it to the memory resource 303 for storage as represented by step 218.

Sub-routine 219, commences upon non-transitory computer readable memory device 305 receiving a message hook from the memory resource 303 that step 218 has been successfully completed, and an updated velocity model is computed at 219, using the stored initial velocity perturbation and the stored initial velocity model. This updated velocity model assumes the numerical representation of $V_{k+1}$, wherein $V_{k+1}$ is at the current k+1-th iteration of the prior velocity model. Therefore, for the first computed updated velocity model the representation would be as follows $V_1$ (one more iteration than the initial velocity model $V_0$), whilst at the next loop the updated velocity model would end up being $V_2$, and so on. The lastly computed updated velocity model then gets generated at 220 by the non-transitory computer readable memory device 305. The updated velocity models generated at 220, do not get stored to the memory resource 303 to avoid having to pre-program the non-transitory computer readable memory device 305 to create a versioning system for each updated velocity model, as well as to save computational resources. In fact, only once the loop started by step 227 gets completed is when the non-transitory computer readable memory device 305 will message the memory resource 303, to store the lastly generated (i.e., final velocity model) which occurs at step 233.

Once the updated velocity model has been generated at step 220, FIG. 2B illustrate the rest of the operations performed by the computer implemented method 201. Here, the non-transitory computer readable memory device 305 will begin computing an updated stack image at step 221 and updated angle gathers at step 224 by performing reverse time migration from the generated updated velocity model and the stored surface seismic data. Given the minimal computation resources required to processes steps 221 and 224, the non-transitory computer readable memory device, 305, performs then in parallel which then causes to generate at 223 and 244 as well as store at 225 and 226, the updated stack image, and the update angle gathers. These parallels steps prevent the computing system apparatus from bottlenecking and saves the resources for the iterative step that follows next.

Particularly, the non-transitory computer readable memory device, 305, initiates sub-routine 227 to obtain a set of final flattened image angle gathers. The non-transitory computer readable memory device, 305, compares each generated updated angle gathers to the user-defined flatness value for the initial angle gathers, and only closes the loop upon successfully determining that the lastly updated angle gathers have an updated flatness value is equal to, or less than, the user-defined flatness value for the initial angle gathers. A final "flattened" image angle gathers is then generated at 231, and stored at 232 in the memory resource, 303. Similarly, upon successfully exiting of the loop 227, the non-transitory computer readable memory device, 305 generates at 229 and stores at 230 to the memory resource a stack image. The non-transitory computer readable memory device further stores at 233 the last updated velocity model (i.e., $V_{k+1}$) to the memory resource 303. All of these (i.e., the updated velocity model, the final stack image, and the final angle gathers) are then displayed through a user-interface of the computer output system device 308 and printed using the printing device 313.

Figure 3:
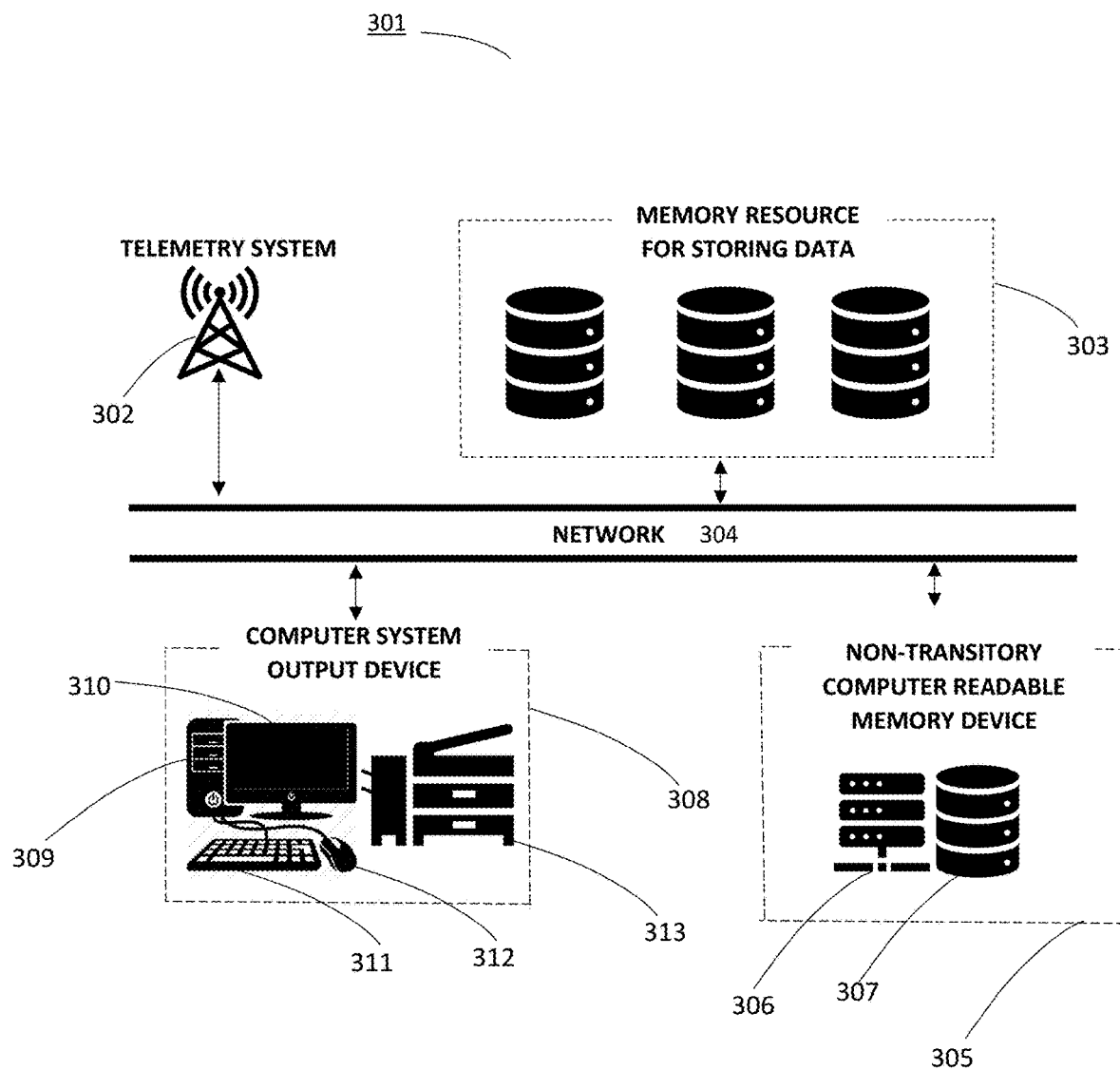
FIG. 3, is a high-level electric diagram, in block form of the computing system apparatus programmed to perform the computer-implemented method, according to an embodiment of the present disclosure.

In fact, as it pertains to FIG. 3, it illustrates a functional block diagram of a computing system apparatus, 301, used to perform an array of operations of the computer-implemented method 201 used for subsurface geo-body recognition in a survey region having high-velocity contrasts. The computing system apparatus, 301, further incorporates; wired and/or wirelessly memory resources 303 for storing data transmitted from the receiving sensors 106 using wireless transmission systems, 115; and transmitted wirelessly to the telemetry system 302 of the computing system apparatus; a computer system output device 308; a non-transitory computer readable memory device 305 having a processor 306 and a memory resource 307; and a network or communication bus 304 connected to each of the individual components of the computing system apparatus by their embedded network interfaces.

The computer system output device, 308, acts as a user interface to the non-transitory computer readable memory device 305, and memory resource 303; to input, set, select, and perform the operations of retrieving, acquiring, computing, generating, storing, and repeating functions (the message hook procedures). Said computer system output device, 308, is further connected wired and/or wirelessly to the non-transitory computer readable memory device 305, and the memory resource 303. The computer system output device, 308, further includes other devices like a central processing unit (CPU), 309, a display or monitor, 310, a keyboard, 311, a mouse, 312, and a printer, 313.

The computer system output device 307, to the non-transitory computer readable memory device 305, and the memory resource 303 all have firmware and software providing for the connection and interoperability of the multiple connected devices. Each further includes an operating system, a set of pre-programmed message hook procedures, and a system application.

The operating system embedded within the computer system output device 307, the non-transitory computer readable memory device 305, and the memory resource 303, may be a Microsoft "WINDOWS" operating system, OS/2 from IBM Corporation, UNIX, LINUX, Sun Microsystems, or Apple operating systems, as well as myriad embedded application operating systems, such as are available from Wind River, Inc.

The message hook procedures of computing system apparatus 301 may, for example, represent an operation or command of the memory resources, 303, the computer system output device, 308, the non-transitory computer readable memory device, 305, which may be currently executing a certain step process or subroutine from the computer-implemented method for small cave recognition using seismic reflection data.

The set of message hook procedures may be first initiated by an input from: the user, like the entering of user-defined flatness value (prior to step 217 of acquiring) or parameters; the manipulation of the computer system output device, 308; the processing of operations in the non-transitory computer readable memory device, 305; or automatically once certain data has been stored or retrieved by either the memory resources, 303, or the non-transitory computer readable memory device, 305. Based on any of these inputs, processes or manipulation events, the memory resources, 303, the non-transitory computer readable memory device, 305, or the computer system output device, 308; generate a data packet that is passed through the network system 404, which are indicative of the event that has occurred as well as the event that needs to occur. When either the memory resources, 303, the non-transitory computer readable memory device, 305, or the computer system output device, 308 receives the data packet, it converts it into a message based on the event and executes the required step of the computer-implement method 201. The computer-implement method 201 includes a set of message hook lists that identifies the series of message hook procedures. When the operating system receives the message, it examines the message hook list to determine if any message hook procedures have registered themselves with the operating system. If at least one message hook procedure has registered itself with the operating system, the operating system passes the message to the registered message hook procedure that appears first on the list. The called message hook executes and returns a value to either the memory resources, 303, the non-transitory computer readable memory device, 305, or the computer system output device, 308, that instructs them to pass the message to the next registered message hook, and either 302, 303, 305 or 308. The non-transitory computer readable memory device, 305, continues executing the operations until all registered message hooks have passed, which indicates the completion of the computer-implemented 201.

After the last message hook procedure has passed or been issued, the non-transitory computer readable memory device, 305, displays through a user-interface, on display 310, a message that indicates to the end user that the non-transitory computer readable memory device, 305, has completed executing the computer-implemented method, and is ready to display on 310, and print on 313, the stored updated velocity model, the stored final stack image, and the stored final angle gathers.

In FIG. 4A, the graphical representation shows the final angle gathers in their non-flat representation to demonstrate the alignment using the computer-implemented method and with +10% velocity error, i.e., $$\gamma = \frac{v_m}{v_t} = 1.1.$$

Figure 4C:
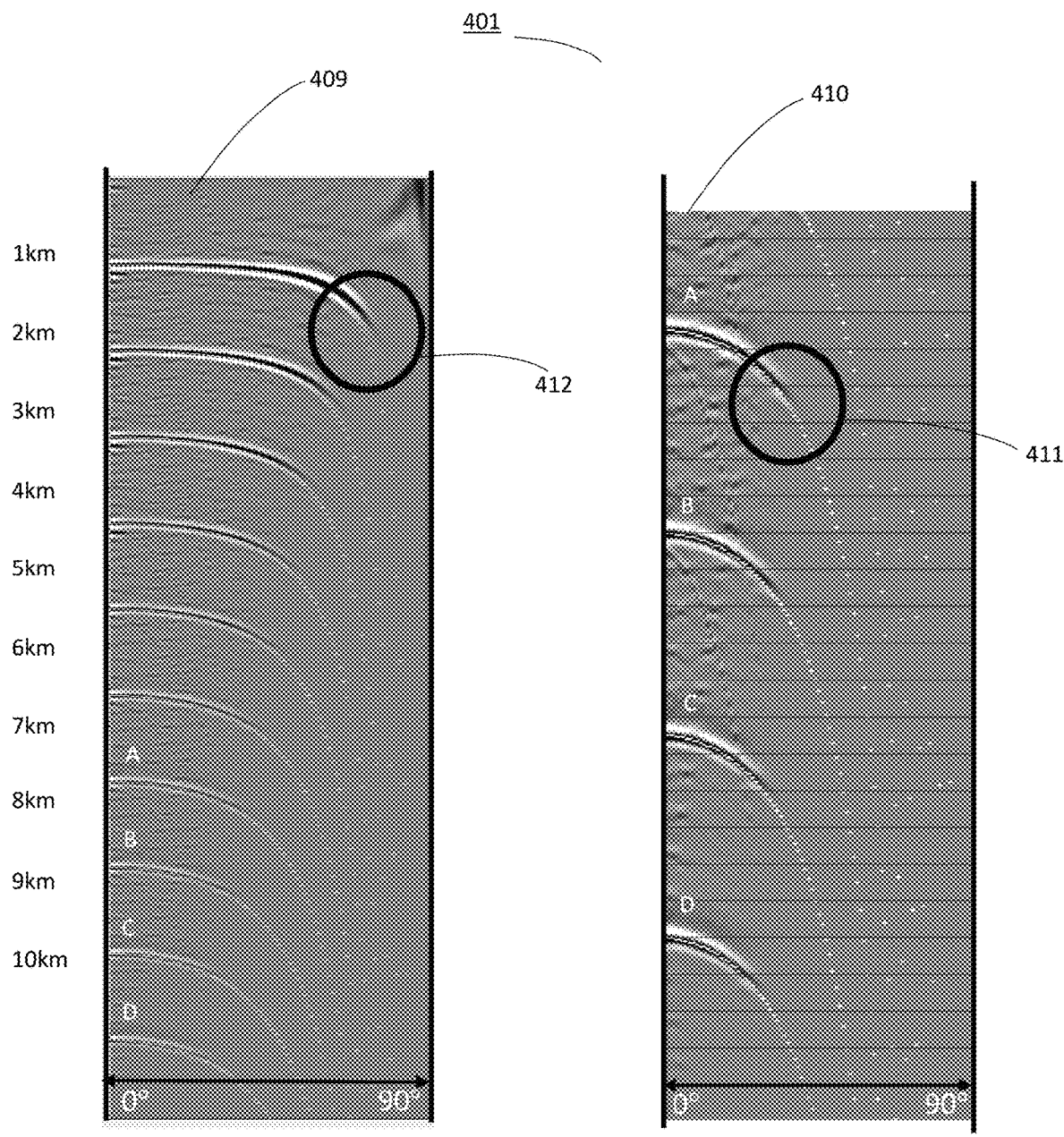

Particularly, 402 represents the gathers as outputted or generated by the non-transitory computer readable memory device 305, while 403 is the same graphical representation but zoomed-in, again, done in such fashion to demonstrate the results obtained with embodiments of the present disclosure. In fact, one can clearly and precisely observe that the white dots 404, which represent how embodiments of the present disclosure generate a residual moveout curvatures of the reverse time migration angle gathers that perfectly converges with the reverse time migration computed angle gathers for the full angle ranges including large angles, in accordance with algorithm (10). Similarly, 405, represent the connections among the peaks of migrated common-image traces in the reverse time migration angle gathers. On the other hand, FIG. 4B illustrates outputted angle gathers 406 in accordance with the existing art (8), particularly those methods that use the Al-Yahya (1989) based RMO algorithms in migration angle domain, wherein the zoomed-in illustration 407, shows the clear and significant discrepancy, misalignment encircled in 408 of the Al-Yahya (1989) derived analytical residual moveout curvatures (represented by the white dots) against the reverse time migration computed angle gathers (represented by the peaks of the migrated image traces). Moreover, FIG. 4C illustrates outputted angle gathers 409 in accordance with the existing art (9), particularly those methods that use the Biondi and Symes' (2004) based RMO algorithms in true angle domain, wherein the zoomed-in illustration 410, shows the clear (albeit small) discrepancy, misalignment, or non-convergence encircled in 411 of the Biondi and Symes (2004) derived analytical residual moveout curvatures (represented by the white dots) against the reverse time migration computed angle gathers (represented by the peaks of the migrated image traces). Since the deviation, discrepancy, misalignment, or non-convergence shown at 411 is small, a more relevant deviation, discrepancy, misalignment, or non-convergence is shown at higher angles as encircled by 412. As aforementioned causes those skilled in the art to continue the process of reiteration thereby consuming more time, computational resources, as well as a project's monetary resources, or decide to continue their analysis with these discrepancies, misalignments, or non-convergences.

Unless specifically stated otherwise, terms such as "defining", "creating", "including", "representing", "pre-analyzing", "pre-defining", "choosing", "building", "assigning", "creating", "introducing", "eliminating", "re-meshing", "integrating", "discovering", "performing", "predicting", "determining", "inputting", "outputting", "identifying", "analyzing", "using", "assigning", "disturbing", "increasing", "adjusting", "incorporating", "simulating", "decreasing", "distributing", "specifying", "extracting", "displaying", "executing", "implementing", and "managing", or the like, may refer to the action and processes of a computer system, or other electronic device, that transforms data represented as physical (electronic, magnetic, or optical) quantities within some electrical device's storage, like memory resources, or non-transitory computer readable memory, into other data similarly represented as physical quantities within the storage, or in transmission or display devices.

According to the preferred embodiment of the present invention, certain hardware, and software descriptions were detailed, merely as example embodiments and are not to limit the structure of implementation of the disclosed embodiments. For example, although many internal, and external components of the computing system apparatus of FIG. 3 have been described, those with ordinary skills in the art will appreciate that such components and their interconnection are well known. Additionally, certain aspects of the disclosed invention may be embodied in software that is executed using one or more non-transitory computer readable memory device 305. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

As used herein the term "survey region" refers to an area or volume of geologic interest, and may be associated with the geometry, attitude and arrangement of the area or volume at any measurement scale. A region may have characteristics such as folding, faulting, cooling, unloading, and/or fracturing that has occurred therein.

As used herein, the term "computing" encompasses a wide variety of actions, including calculating, determining, processing, deriving, investigation, look ups (e.g., looking up in a table, a database, or another data structure), ascertaining and the like. It may also include receiving (e.g., receiving information), accessing (e.g., accessing data in a memory) and the like. Also, "computing" may include resolving, selecting, choosing, establishing, and the like.

As used herein, the term "trim static", "static trimming" is used to refer to any time shift that is estimated from the cross-correlation process and applied directly to the input trace.

As used herein, "subsurface", and "subterranean" means beneath the top surface of any mass of land at any elevation or over a range of elevations, whether above, below or at sea level, and/or beneath the floor surface of any mass of water, whether above, below or at sea level.

Embodiments disclosed herein also relate to computer-implemented system, and computer system for performing the operations herein. This system may be specially constructed for the required purposes, or it may comprise a general-purpose computer selectively activated or reconfigured by a computer program or code stored in the memory resources, or non-transitory computer readable memory. As such, the computer program or code may be stored or encoded in a computer readable medium or implemented over some type of transmission medium. A computer-readable medium includes any medium or mechanism for storing or transmitting information in a form readable by a machine, such as a computer ('machine' and 'computer' may be used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable wired or wireless transmission medium, for transmitting signals such as electrical, optical, acoustical, or other form of propagated signals (e.g., carrier waves, infrared signals, digital signals, etc.)).

A computer system as used herein, typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as servers), and hand-held processing devices (for example smart phones, personal digital assistants (PDAs), or personal computing devices (PCDs)). Further, hardware may include any physical device that can store machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as non-transitory computer readable media like external hard drives, or flash memory, for example). Software may include source or object code, encompassing any set of instructions capable of being executed in a client machine, server machine, remote desktop, or terminal.

Combinations of software and hardware could also be used for providing enhanced functionality and performance for certain embodiments of the disclosed invention. One example is to directly manufacture software functions into a silicon chip. Accordingly, combinations of hardware and software are also included within the definition of a computer system and are thus envisioned by the invention as possible equivalent structures and equivalent methods.

Computer-readable mediums or memory resources include passive data storage, such as a random-access memory (RAM) as well as semi-permanent data storage such as external hard drives, and external databases, for example. In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across non-transitory transmission mediums and stored and transported across various data structures, and, thus, may be used to transport an embodiment of the invention.

The system computer may be designed to work on any specific architecture. For example, the system may be executed on a high-performance computing system, which typically comprise the aggregation of multiple single computers, physically connected, or connected over local area networks, client-server networks, wide area networks, internets, hand-held and other portable and wireless devices, and networks.

A "computer system output device" or an "output device" includes the direct act that causes generating, as well as any indirect act that facilitates generation. Indirect acts include providing software to a user, maintaining a website through which a user is enabled to affect a display, hyperlinking to such a website, or cooperating or partnering with an entity who performs such direct or indirect acts. Thus, a user may operate alone or in cooperation with a third-party vendor to enable the reference signal to be generated on a display device. A display device may be included as an output device, and shall be suitable for displaying the required information, such as without limitation a CRT monitor, an LCD monitor, a plasma device, a flat panel device, or printer. The display device may include a device which has been calibrated using any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, providing of the reference image could involve enabling the subject to obtain the reference image in hard copy form via a printer. For example, information, software, and/or instructions could be transmitted (e.g., electronically, or physically via a data storage device or hard copy) and/or otherwise made available (e.g., via a network) to facilitate the subject using a printer to print a hard copy form of reference image. In such an example, the printer may be a printer which has been calibrated using any conventional software intended to be used in evaluating, correcting, and/or improving printing results (e.g., a color printer that has been adjusted using color correction software).

A database, or multiple databases may comprise any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across a local network, a wireless network of the Internet.

Furthermore, modules, features, attributes, methodologies, and other aspects can be implemented as software, hardware, firmware, or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined Additionally, the flowcharts and block diagrams in the Figures illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For examples, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified hardware functions or acts, or combinations of special purpose hardware and computer instructions.

While in the foregoing specification this disclosure has been described in relation to certain preferred embodiments thereof, and many details have been set forth for purpose of illustration, the invention is not to be unduly limited to the foregoing which has been set forth for illustrative purposes. On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well.

I claim:

1. A computer-implemented method performed by a computing system apparatus for obtaining a subsurface stack image, subsurface angle gathers, and a subsurface velocity model, over an entire survey region having high velocity contrast geo-bodies, the method comprising:

retrieving, by the computing system apparatus having a non-transitory computer readable memory coupled to a computer system input device, coupled to a memory resource, and coupled to a computer system output device, an input velocity model wherein the input velocity model is essentially derived from P-waves over the entire survey region;

retrieving, by the non-transitory computer readable memory device from the coupled memory resource, a surface seismic reflection data essentially consisting of common shot P-waves, over the entire survey region;

storing the retrieved the input velocity model and the retrieved surface seismic reflection data to the memory resource, using the non-transitory computer readable memory device;

computing, by the non-transitory computer readable memory device, an initial stack image and initial angle gathers, by performing initial reverse time migration from the stored input velocity model and the stored surface seismic reflection data;

generating an initial stack image and initial angle gathers from the computed initial stack image and initial angle gathers, using the non-transitory computer readable memory device;

storing the generated initial stack image and initial angle gathers, to the memory resource using the non-transitory computer readable memory device;

acquiring, by the non-transitory computer readable memory device from the memory resource, a user-defined flatness value for the stored initial angle gathers;

computing, by the non-transitory computer readable memory device, a dip field by analyzing shifts in correlation using moving-window technique through the stored initial stack image;

storing the computed dip field to the memory resource, using the non-transitory computer readable memory device;

computing, by the non-transitory computer readable memory device, a residual moveout migration depth in true angle domain using the stored initial angle gathers, according to the following expression:

$$z_m = z_t \gamma \sqrt{1 + \left(1 - \frac{1}{\gamma^2}\right)\tan^2\theta_t} \, ;$$

generating, by the non-transitory computer readable memory device, a residual moveout migration depth in true angle domain using the computed residual moveout migration depth in true angle domain;

storing the generated residual moveout migration depth in true angle domain to a memory resource using the non-transitory computer readable memory device;

computing an initial velocity perturbation from the stored residual moveout migration depth in true angle domain and from the stored dip field, by performing tomography inversion, using the non-transitory computer readable memory device;

generating an initial velocity perturbation from the computed initial velocity perturbation using the non-transitory computer readable memory device;

storing the generated initial velocity perturbation to a memory resource using the non-transitory computer readable memory device;

computing, by the non-transitory computer readable memory device, an updated velocity model from the stored initial velocity perturbation and the stored initial velocity model;

generating an updated velocity model from the computed updated velocity model, using the non-transitory computer readable memory device;

computing, by the non-transitory computer readable memory device, an updated stack image and updated angle gathers by performing reverse time migration from the generated updated velocity model and the stored surface seismic data;

generating an updated stack image and updated angle gathers having an updated flatness value, from the computed updated stack image and updated angle gathers, using the non-transitory computer readable memory device;

storing the generated updated stack image and updated angle gathers to a memory resource by the non-transitory computer readable memory device;

repeating the steps of computing a dip field by analyzing shifts in correlation using moving-window technique, storing the computed dip field to the memory resource, computing a residual moveout migration depth in true angle domain, generating a residual moveout migration depth in true angle domain, storing the generated residual moveout migration depth in true angle domain, computing an initial velocity perturbation, generating an initial velocity perturbation, storing the generated initial velocity perturbation, computing an updated velocity model, generating an updated velocity model, computing an updated stack image and updated angle gathers, generating an updated stack image and updated angle gathers having an updated flatness value, storing the generated updated stack image and updated angle gathers having an updated flatness value to a memory resource, until the updated angle gathers having an updated flatness value is equal to, or less than, the user-defined flatness value for the initial angle gathers;

generating, by the non-transitory computer readable memory device, a final stack image and final angle gathers from the stored updated stack image and the stored angle gathers once the repeated updated angle gathers having an updated flatness value is equal to, or less than, the user-defined flatness value for the initial angle gathers; and storing to a memory resource by the non-transitory computer readable memory device, the generated updated velocity model, the generated final stack image, and the generated final angle gathers, once the repeated updated angle gathers having an updated flatness value is equal to, or less than, the user-defined flatness value for the initial angle gathers.

2. A computing system apparatus programmed to perform a set of operations of a computer-implemented method for obtaining a subsurface stack image, subsurface angle gathers, and a subsurface velocity model, over an entire survey region having high velocity contrast geo-bodies, comprising:

a computer system input device for performing the operations of acquiring, retrieving, storing, computing, generating, and repeating;

a memory resource, for storing data corresponding to the operations of acquiring and storing an input velocity model, a surface seismic reflection data, an initial stack image, initial angle gathers, a user-defined flatness value for the stored angle gathers, a dip field by analyzing shifts in correlation using moving-window technique, a residual moveout migration depth in true angle domain, an initial velocity perturbation, an updated velocity model, an updated stack image, an updated angle gathers, a final stack image, and final angle gathers;

a computer system output device coupled to the memory resource for generating data corresponding to the operations of generating an initial stack image, initial angle gathers, a residual moveout migration depth in true angle domain, an initial velocity perturbation, an updated velocity model, an updated stack image, an updated angle gathers having an updated flatness value, a final stack image, and final angle gathers; and a non-transitory computer readable memory device coupled to the computer system input device, coupled to the memory resource, and coupled to the computer system output device, for performing the operations of:

retrieving, by the computing system apparatus having a non-transitory computer readable memory coupled to a computer system input device, coupled to a memory resource, and coupled to a computer system output device, an input velocity model wherein the input velocity model is essentially derived from P-waves over the entire survey region;

retrieving, by the non-transitory computer readable memory device from the coupled memory resource, a surface seismic reflection data essentially consisting of common shot P-waves, over the entire survey region;

storing the retrieved the input velocity model and the retrieved surface seismic reflection data to the memory resource, using the non-transitory computer readable memory device;

computing, by the non-transitory computer readable memory device, an initial stack image and initial angle gathers, by performing initial reverse time migration from the stored input velocity model and the stored surface seismic reflection data;

generating an initial stack image and initial angle gathers from the computed initial stack image and initial angle gathers, using the non-transitory computer readable memory device;

storing the generated initial stack image and initial angle gathers, to the memory resource using the non-transitory computer readable memory device;

acquiring, by the non-transitory computer readable memory device from the memory resource, a user-defined flatness value for the stored initial angle gathers;

computing, by the non-transitory computer readable memory device, a dip field by analyzing shifts in correlation using moving-window technique through the stored initial stack image;

storing the computed dip field to the memory resource, using the non-transitory computer readable memory device;

computing, by the non-transitory computer readable memory device, a residual moveout migration depth in true angle domain using the stored initial angle gathers, according to the following expression:

$$z_m = z_t \gamma \sqrt{1 + \left(1 - \frac{1}{\gamma^2}\right) \tan^2 \theta_t};$$

generating, by the non-transitory computer readable memory device, a residual moveout migration depth in true angle domain using the computed residual moveout migration depth in true angle domain;

storing the generated residual moveout migration depth in true angle domain to a memory resource using the non-transitory computer readable memory device;

computing an initial velocity perturbation from the stored residual moveout migration depth in true angle domain and from the stored dip field, by performing tomography inversion, using the non-transitory computer readable memory device;

generating an initial velocity perturbation from the computed initial velocity perturbation using the non-transitory computer readable memory device;

storing the generated initial velocity perturbation to a memory resource using the non-transitory computer readable memory device;

computing, by the non-transitory computer readable memory device, an updated velocity model from the stored initial velocity perturbation and the stored initial velocity model;

generating an updated velocity model from the computed updated velocity model, using the non-transitory computer readable memory device;

computing, by the non-transitory computer readable memory device, an updated stack image and updated angle gathers by performing reverse time migration from the generated updated velocity model and the stored surface seismic data;

generating an updated stack image and updated angle gathers having an updated flatness value, from the computed updated stack image and updated angle gathers, using the non-transitory computer readable memory device;

storing the generated updated stack image and updated angle gathers to a memory resource by the non-transitory computer readable memory device;

repeating the steps of computing a dip field by analyzing shifts in correlation using moving-window technique, storing the computed dip field to the memory resource, computing a residual moveout migration depth in true angle domain, generating a residual moveout migration depth in true angle domain, storing the generated residual moveout migration depth in true angle domain, computing an initial velocity perturbation, generating an initial velocity perturbation, storing the generated initial velocity perturbation, computing an updated velocity model, generating an updated velocity model, computing an updated stack image and updated angle gathers, generating an updated stack image and updated angle gathers having an updated flatness value, storing the generated updated stack image and updated angle gathers having an updated flatness value to a memory resource, until the updated angle gathers having an updated flatness value is equal to, or less than, the user-defined flatness value for the initial angle gathers;

generating, by the non-transitory computer readable memory device, a final stack image and final angle gathers from the stored updated stack image and the stored angle gathers once the repeated updated angle gathers having an updated flatness value is equal to, or less than, the user-defined flatness value for the initial angle gathers; and storing to a memory resource by the non-transitory computer readable memory device, the generated updated velocity model, the generated final stack image, and the generated final angle gathers, once the repeated updated angle gathers having an updated flatness value is equal to, or less than, the user-defined flatness value for the initial angle gathers.

3. The computing system apparatus of claim 2, wherein the computer system output device is further programmed to display a user-interface and print the stored updated velocity model, the stored final stack image, and the stored final angle gathers.

* * * * *